United States Patent
Romeu (10) Patent No.: US 12,306,322 B2
(45) Date of Patent: May 20, 2025

(54) TRANSIENT SATELLITE DOPPLER SIGNAL PROCESSING FOR CENTIMETER ACCURACY NON-GPS ASSURED POSITION, NAVIGATION, AND TIMING

(71) Applicant: Alluvionic, Inc., Melbourne, FL (US)

(72) Inventor: Ricardo Romeu, Melbourne, FL (US)

(73) Assignee: Alluvionic, Inc., Melbourne, FL (US)

( * ) Notice: Subject to any disclaimer, the term of this patent is extended or adjusted under 35 U.S.C. 154(b) by 404 days.

(21) Appl. No.: 18/050,442

(22) Filed: Oct. 27, 2022

(65) Prior Publication Data

US 2023/0126365 A1 Apr. 27, 2023

Related U.S. Application Data

(60) Provisional application No. 63/263,111, filed on Oct. 27, 2021.

(51) Int. Cl.
G01S 5/02 (2010.01)
G01S 5/10 (2006.01)

(52) U.S. Cl.
CPC ........ G01S 5/0246 (2020.05); G01S 5/02213 (2020.05); G01S 5/0249 (2020.05); G01S 5/10 (2013.01)

(58) Field of Classification Search
CPC .. G01S 5/0246; G01S 5/0249; G01S 5/02212; G01S 5/10

USPC ....................................................... 342/357.78
See application file for complete search history.

(56) References Cited

U.S. PATENT DOCUMENTS

| 11,808,867 B2* | 11/2023 | Kassas | G01S 19/49 |
| 12,158,513 B2* | 12/2024 | Lin | G01S 19/258 |
| 12,206,487 B2* | 1/2025 | Hu | H04B 7/1855 |
| 2016/0377700 A1* | 12/2016 | Englert | G01S 19/00 |
| | | | 342/357.78 |

* cited by examiner

Primary Examiner — Harry K Liu
(74) Attorney, Agent, or Firm — Daniel C. Pierron; Widerman Malek, PL (57) ABSTRACT

A system and method for transient satellite doppler signal position determination by receiving multiple measured signals, determining transmission characteristics for those signals, determining orbital characteristics of satellites associated with those signals via a Doppler calculation, identifying the satellites from the transmission and orbital characteristics, determining a closest approach point responsive to identifying the satellites and the Doppler calculations, determining current positions of the satellites relative to the receiver from the closest approach point determinations via comparison to an orbital location-defining modeling equation associated with the first satellite, and determining a geolocation of the receiver responsive to each of the current position of the satellites relative to the receiver.

20 Claims, 5 Drawing Sheets

| | |
|---|---|
| Receive a plurality of measured signals associated with a plurality of satellites from the receiver, each measured signal of the plurality of measured signals being associated with a respective satellite of the plurality of satellites | 402 |
| Determine a one or more of transmission characteristics for each measured signal of the plurality of measured signals | 404 |
| Identify a subset of satellite candidates from a known satellite data set responsive to the one or more transmission characteristics for each measured signal | 406 |
| Determine an orbital characteristic of each satellite of the plurality of satellites from the plurality of measured signals responsive to an indication of a current time via a Doppler calculation | 408 |
| Identify at least three of the plurality of satellites from the subset of satellite candidates for each measured signal responsive to at least one of the one or more transmission characteristics and the orbital characteristic | 410 |
| Determine a closest approach point for each identified satellite responsive to identifying each satellite and the Doppler calculation | 412 |
| Determine a current position of each identified satellite relative to the receiver from the closest approach point determination via comparison to an orbital location-defining modeling equation associated with each satellite | 414 |
| Determine a geolocation of the receiver responsive to the current position of each satellite of the plurality of satellites relative to the receiver. | 416 |

TRANSIENT SATELLITE DOPPLER SIGNAL PROCESSING FOR CENTIMETER ACCURACY NON-GPS ASSURED POSITION, NAVIGATION, AND TIMING

RELATED APPLICATIONS

This application claims priority under 35 U.S.C. § 119(e) of U.S. Provisional Patent Application Ser. No. 63/263,111 filed on Oct. 27, 2021 and titled Transient Satellite Doppler Signal Processing for Centimeter Accuracy Non-GPS Assured Position, Navigation, and Timing. The content of this application is incorporated herein by reference.

FIELD OF THE INVENTION

The present invention relates to systems and methods for determining location as an alternative to GPS.

BACKGROUND

Systems to detect, prevent and thwart Global Positioning System (GPS) spoofing and service denial, i.e. intentional interference with GPS signals to cause a GPS device to determine an inaccurate location or to be unable to determine a location, are in constant development. Numerous approaches have included the use of other classified and commercial celestial assets to either enhance or augment GPS performance of existing infrastructure. These approaches require ground stations or dedicated signals and flying assets, requiring significant additional expense and operational capacity. There is a need for a system that can determine a location that is not susceptible to these types of countermeasures while having the same or better location-determining capability of GPS.

Additionally, the troposphere and ionosphere can change the speed of propagation of a GPS signal. Due to atmospheric conditions, the atmosphere refracts the satellite signals as they pass through on their way to the earth's surface. To fix this, GPS can use two separate frequencies to minimize propagation speed error. Depending on conditions, this type of GPS error could offset the position approximately 5 meters. Accordingly, there is a need in the art for a location determination system that reduces the RF signal refraction error.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for transient satellite doppler signal position determination. The system also includes an antenna positioned at a point of interest and configured to measure a received electromagnetic radiation (EMR) signal. The system also includes a multi-channel receiver operably coupled to the antenna and configured to generate a measured signal by interpreting the received EMR signal from the antenna. The system also includes an internal clock operable to provide an indication of a current time. The system also includes a processor operably coupled to each of the receiver and the internal clock and configured to receive the measured signal from the receiver and the indication of the current time from the clock. The system also includes a non-transitory storage medium operably coupled to the processor and may include software thereon configured to cause the processor to perform the following steps: receive a first measured signal associated with a first satellite from the receiver; determine one or more transmission characteristics from the first measured signal; identify a first subset of satellite candidates from a known satellite data set responsive to the one or more transmission characteristics; determine a first orbital characteristic of the first satellite from the first measured signal responsive to an indication of the current time via a first doppler calculation; identify the first satellite from the first subset of satellite candidates responsive to at least one of the one or more transmission characteristics and the first orbital characteristic; determine a first closest approach point responsive to identifying the first satellite and the first doppler calculation; determine a current position of the first satellite relative to the receiver from the first closest approach point determination via comparison to an orbital location-defining modeling equation associated with the first satellite; receive a second measured signal associated with a second satellite from the receiver; determine one or more transmission characteristics from the second measured signal; identify a second subset of satellite candidates from a known satellite data set responsive to the one or more transmission characteristics of the second measured signal; determine a second orbital characteristic of the second satellite from the second measured signal via a second doppler calculation; identify the second satellite from the second subset of satellite candidates responsive to at least one of the one or more transmission characteristics of the second measured signal and the second orbital characteristic; determine a second closest approach point responsive to identifying the second satellite and the second doppler calculation; determine a current position of the second satellite relative to the receiver from the second closest approach point determination via comparison to the orbital location-defining modeling equation associated with the second satellite; receive a third measured signal associated with a third satellite from the receiver; determine one or more transmission characteristics from the third measured signal; identify a third subset of satellite candidates from a known satellite data set responsive to the one or more transmission characteristics of the third measured signal; determine a third orbital characteristic of the third satellite from the third measured signal via a third doppler calculation; identify the third satellite from the third subset of satellite candidates responsive to at least one of the one or more transmission characteristics of the third measured signal and the third orbital characteristic; determine a third closest approach point responsive to identifying the third satellite and the third doppler calculation; determine a current position of the third satellite relative to the receiver from the third closest approach point determination via comparison to the orbital location-defining modeling equation associated with the third satellite; and determine a geolocation of the receiver responsive to each of the current position of the first satellite relative to the receiver, the current position of the second satellite relative to the receiver, and the current position of the third satellite relative to the receiver. Other embodiments of this aspect include corresponding computer systems, apparatus, and computer programs recorded on one or more computer storage devices, each configured to perform the actions of the methods.

Implementations of the above embodiment may include one or more of the following features. Determining the first orbital characteristic via the first doppler calculation may include determining a first measured frequency of the first measured signal, determining a second measured frequency of the first measured signal, determining a frequency shift of the first measured frequency and the second measured frequency of the first measured signal, determining an angular direction of the first satellite from the first measured signal, determining a first signal source frequency from the known satellite data set, and determining the first doppler calculation from the first measured frequency, the first angular direction, and the first signal source frequency, and determining the first orbital characteristic from the first doppler calculation. Additionally, determining the second orbital characteristic via the second doppler calculation may include determining a first measured frequency of the second measured signal, determining a second measured frequency of the second measured signal, determining a frequency shift of the second measured frequency and the second measured frequency of the second measured signal, determining an angular direction of the second satellite from the second measured signal, determining a second signal source frequency from the known satellite data set, and determining the second doppler calculation from the second measured frequency, the second angular direction, and the second signal source frequency, and determining the second orbital characteristic from the second doppler calculation. Determining the third orbital characteristic via the third doppler calculation may include determining a first measured frequency of the third measured signal, determining a second measured frequency of the third measured signal, determining a frequency shift of the third measured frequency and the second measured frequency of the third measured signal, determining an angular direction of the third satellite from the third measured signal, determining a third signal source frequency from the known satellite data set, determining the third doppler calculation from the third measured frequency, the third angular direction, and the third signal source frequency, and determining the third orbital characteristic from the third doppler calculation.

In some embodiments, the software may further be configured to receive an update to the known satellite data set and update the known satellite data set with the update.

In some embodiments, determining the first orbital characteristic of the first satellite may include at least one of determining a first apex of closest approach of the first satellite from the first measured signal, determining a first orbital height of the first satellite from the first measured signal, and determining a first trajectory of the first satellite from the first measured signal. Determining the second orbital characteristics of the second satellite may include at least one of determining a second apex of closest approach of the second satellite from the second measured signal, determining a second orbital height of the second satellite from the second measured signal, and determining a second trajectory of the second satellite from the second measured signal. Determining the third orbital characteristics of the third satellite may include at least one of: determining a third apex of closest approach of the third satellite from the third measured signal, determining a third orbital height of the third satellite from the third measured signal, and determining a third trajectory of the third satellite from the third measured signal.

In some embodiments, determining the current position of the first satellite relative to the receiver may include performing a satellite perturbation error reduction calculation, determining the current position of the second satellite relative to the receiver may include performing a satellite perturbation error reduction calculation, and determining the current position of the third satellite relative to the receiver may include performing a satellite perturbation error reduction calculation.

In some embodiments, the internal clock may be one of an oscillator and an atomic clock. In some embodiments, each of the first measured signal, the second measured signal, and the third measured signal may be measured passively. In some embodiments, the antenna may configured to measure EMR within a radio frequency wavelength range.

In some embodiments, the first orbital characteristic identified from the first doppler calculation may be a first orbital velocity of the first satellite, the second orbital characteristic identified from the second doppler calculation may be a second orbital velocity of the second satellite, and the third orbital characteristic identified from the third doppler calculation may be a third orbital velocity of the third satellite. In some embodiments, the orbital location-defining modeling equation may be a two-line element modeling equation. In some embodiments, the transmission characteristics may include a transmission frequency, a transmission power, a transmission compression characteristic, and waveform modulations.

Implementations of the described techniques may include hardware, a method or process, or computer software on a computer-accessible medium.

One general aspect includes a method of location determination by transient satellite doppler signal measurement may include the steps of receiving a first measured signal associated with a first satellite from the receiver. The method also includes determining one or more transmission characteristics from the first measured signal. The method also includes identifying a first subset of satellite candidates from a known satellite data set responsive to the one or more transmission characteristics. The method also includes determining a first orbital characteristic of the first satellite from the first measured signal responsive to an indication of a current time via a first doppler calculation. The method also includes identifying the first satellite from the first subset of satellite candidates responsive to at least one of the one or more transmission characteristics and the first orbital characteristic. The method also includes determining a first closest approach point responsive to identifying the first satellite and the first doppler calculation. The method also includes determining a current position of the first satellite relative to the receiver from the first closest approach point determination via comparison to an orbital location-defining modeling equation associated with the first satellite. The method also includes receiving a second measured signal associated with a second satellite from the receiver. The method also includes determining one or more transmission characteristics from the second measured signal. The method also includes identifying a second subset of satellite candidates from a known satellite data set responsive to the one or more transmission characteristics of the second measured signal. The method also includes determining a second orbital characteristic of the second satellite from the second measured signal via a second doppler calculation. The method also includes identifying the second satellite from the second subset of satellite candidates responsive to at least one of the one or more transmission characteristics of the second measured signal and the second orbital characteristic. The method also includes determining a second closest approach point responsive to identifying the second satellite and the second doppler calculation. The method also includes determining a current position of the second satellite relative to the receiver from the second closest approach point determination via comparison to the orbital location-defining modeling equation associated with the second satellite. The method also includes receiving a third measured signal associated with a third satellite from the receiver. The method also includes determining one or more transmission characteristics from the third measured signal. The method also includes identifying a third subset of satellite candidates from a known satellite data set responsive to the one or more transmission characteristics of the third measured signal. The method also includes determining a third orbital characteristic of the third satellite from the third measured signal via a third doppler calculation. The method also includes identifying the third satellite from the third subset of satellite candidates responsive to at least one of the one or more transmission characteristics of the third measured signal and the third orbital characteristic. The method also includes determining a third closest approach point responsive to identifying the third satellite and the third doppler calculation. The method also includes determining a current position of the third satellite relative to the receiver from the third closest approach point determination via comparison to the orbital location-defining modeling equation associated with the third satellite. The method also includes determining a geolocation of the receiver responsive to each of the current position of the first satellite relative to the receiver, the current position of the second satellite relative to the receiver, and the current position of the third satellite relative to the receiver. Other embodiments of this aspect include corresponding computer systems, apparatus, and computer programs recorded on one or more computer storage devices, each configured to perform the actions of the methods.

Implementations may include one or more of the following features. The method where determining the first orbital characteristic via the first doppler calculation may include determining a first measured frequency of the first measured signal, determining a second measured frequency of the first measured signal, determining a frequency shift of the first measured frequency and the second measured frequency of the first measured signal, determining an angular direction of the first satellite from the first measured signal, determining a first signal source frequency from the known satellite data set; determining the first doppler calculation from the first measured frequency, the first angular direction, and the first signal source frequency, and determining the first orbital characteristic from the first doppler calculation. Determining the second orbital characteristic via the second doppler calculation may include determining a first measured frequency of the second measured signal, determining a second measured frequency of the second measured signal, determining a frequency shift of the second measured frequency and the second measured frequency of the second measured signal, determining an angular direction of the second satellite from the second measured signal, determining a second signal source frequency from the known satellite data set, determining the second doppler calculation from the second measured frequency, the second angular direction, and the second signal source frequency, and determining the second orbital characteristic from the second doppler calculation. Determining the third orbital characteristic via the third doppler calculation may include determining a first measured frequency of the third measured signal, determining a second measured frequency of the third measured signal, determining a frequency shift of the third measured frequency and the second measured frequency of the third measured signal, determining an angular direction of the third satellite from the third measured signal, determining a third signal source frequency from the known satellite data set, and determining the third doppler calculation from the third measured frequency, the third angular direction, and the third signal source frequency; and determining the third orbital characteristic from the third doppler calculation.

In some embodiments, determining the first orbital characteristic of the first satellite may include at least one of determining a first apex of closest approach of the first satellite from the first measured signal, determining a first orbital height of the first satellite from the first measured signal, and determining a first trajectory of the first satellite from the first measured signal. Determining the second orbital characteristics of the second satellite may include at least one of determining a second apex of closest approach of the second satellite from the second measured signal, determining a second orbital height of the second satellite from the second measured signal, and determining a second trajectory of the second satellite from the second measured signal. Determining the third orbital characteristics of the third satellite may include at least one of determining a third apex of closest approach of the third satellite from the third measured signal, determining a third orbital height of the third satellite from the third measured signal, and determining a third trajectory of the third satellite from the third measured signal.

In some embodiments, each of the first measured signal, the second measured signal, and the third measured signal are measured passively. In some embodiments, the first orbital characteristic identified from the first doppler calculation is a first orbital velocity of the first satellite, the second orbital characteristic identified from the second doppler calculation is a second orbital velocity of the second satellite, and the third orbital characteristic identified from the third doppler calculation is a third orbital velocity of the third satellite. In some embodiments, the orbital location-defining modeling equation is a two-line element modeling equation. The transmission characteristics may include a transmission frequency, a transmission power, a transmission compression characteristic, and waveform modulations.

Another general aspect includes a method of location determination by transient satellite doppler signal measurement may include the steps of receiving a plurality of measured signals associated with a plurality of satellites from the receiver, each measured signal of the plurality of measured signals being associated with a respective satellite of the plurality of satellites. The method also includes determining a one or more of transmission characteristics for each measured signal of the plurality of measured signals. The method also includes identifying a subset of satellite candidates from a known satellite data set responsive to the one or more transmission characteristics for each measured signal. The method also includes determining an orbital characteristic of each satellite of the plurality of satellites from the plurality measured signal responsive to an indication of a current time via a doppler calculation. The method also includes identifying at least three satellites, defining identified satellites, of the plurality of satellites from the subset of satellite candidates for each measured signal responsive to at least one of the one or more transmission characteristics and the orbital characteristic. The method also includes determining a closest approach point for each satellite of the identified satellites responsive to identifying each satellite and the doppler calculation. The method also includes determining a current position of each satellite of the identified satellites relative to the receiver from the closest approach point determination via comparison to an orbital location-defining modeling equation associated with each satellite. The method also includes determining a geolocation of the receiver responsive to the current position of each satellite of the plurality of identified satellites relative to the receiver. Other embodiments of this aspect include corresponding computer systems, apparatus, and computer programs recorded on one or more computer storage devices, each configured to perform the actions of the methods.

Implementations may include one or more of the following features. Determining the orbital characteristic via the doppler calculation may include determining a first measured frequency of each measured signal of the plurality of measured signals, determining a second measured frequency of each measured signal of the plurality of measured signals, determining a frequency shift of the first measured frequency and the second measured frequency of each measured signal of the plurality of measured signals, determining an angular direction of each satellite of the plurality of satellites from each measured signal of the plurality of measured signals, determining a signal source frequency for each satellite of the plurality of satellites from the known satellite data set, determining the doppler calculation from the first measured frequency of each measured signal, the angular direction of each satellite associated with each measured signal, and the signal source frequency of each satellite associated with each measured signal, and determining the orbital characteristic from the doppler calculation for each satellite of the plurality of satellites.

DETAILED DESCRIPTION OF THE DRAWINGS

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for determining location based on measurement of satellite signals and the change in frequency thereof from the Doppler effect.

Figures 1A, 1B:
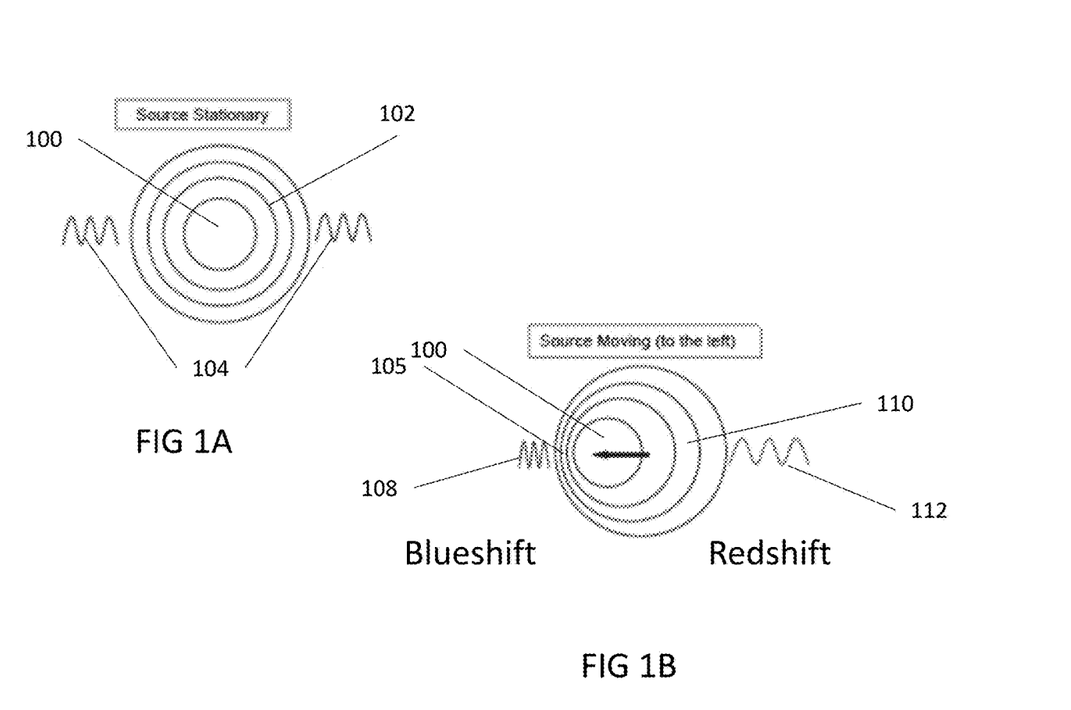
FIGS. 1A and 1B illustrate the Doppler effect observable between a stationary signal source and a signal source in motion.

The Doppler effect is observed using the known differences between source waves and receiver waves. As shown in FIG. 1A, a signal 102 emitted by a stationary signal source 100 propagates evenly into space, with the frequency 104 of the signal remaining the same in every direction. When the signal source 100 is in motion, as shown in FIG. 1B, the signal emanating in the direction of travel 106 has its frequency 108 compressed and, accordingly, increased, resulting in what is known as a blueshift. In contrast, the signal emanating opposite the direction of travel 110 has its frequency 112 expanded and, accordingly, decreased, resulting in what is known as a redshift. This includes electromagnetic or sound waves moving at different speeds with respect to each other. The frequency is observed higher than nominal when the distance between the source and receiver is decreasing, and lower than nominal frequency when the distance is increasing. The mathematical formula is as follows:

$$f_m = f_s \times \frac{\sqrt{1 - (V/c)^2}}{1 - (V/c)\cos\theta}$$

$$\Delta f = f_m - f_s$$

$f_m$ : Observed frequency $f_s$ : Frequency of signal source $\Delta f$ : Change in frequency of carrier wave $V$ : Speed of signal source viewed from an observer $\theta$ : Moving direction of signal source viewed from an observer $c$ : Light speed where $f_m$ is the observed frequency, $f_s$ is the frequency of the signal source, $\Delta f$ is the change in frequency of the carrier wave of the signal source, V is the speed of the signal source viewed from a terrestrial observer, θ is the moving direction of the signal source viewed from the terrestrial observer, and c is the speed of light.

The inventive concept comprises transient satellite Doppler signal processing (TSDSP). TSDSP uses the radio frequency (RF) signal of a known satellite and applies the Doppler effect calculation to indicate when an approaching satellite reaches the point of closest approach. Using this technique with three or more satellites allows a position to be calculated. TSDSP works similar to GPS using triangulation to determine a position, but TSDSP passively receives the signal and is only analyzing the waveform without the requirement to decode the actual data. Because this system is agnostic to particular satellite constellations and is able to perform this function with any known satellite through ephemeris data, there is the potential to use any number of satellites when performing the triangulation calculation. This method has been explored as augmentation for GPS and even proposed in conjunction with newer low Earth orbit (LEO) satellites, such as SpaceX's Starlink. It is only recently that small terrestrial antennae technology has developed to a point where this is now possible due to antenna sensitivities in smaller equipment packages. It is now possible to fully study this triangulation technique using statistical methods and doppler characterization of all RF emitting satellites as a complete position, navigation, and timing (PNT) system.

Figure 2:
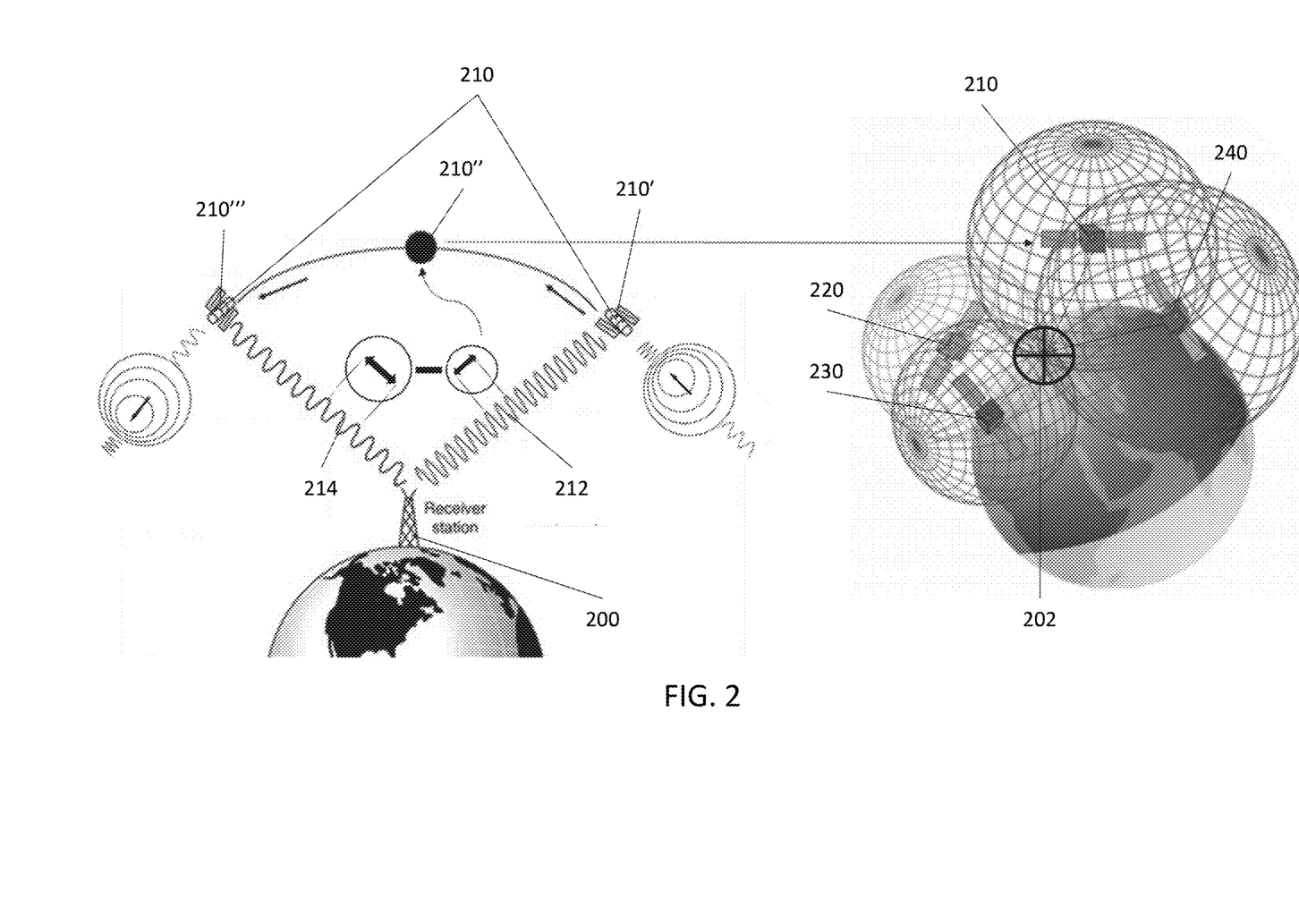
FIG. 2 illustrates measurement of the Doppler effect of a satellite in orbit by a receiver and how to geolocate the receiver from multiple location determinations from multiple satellites according to an embodiment of the invention.

Referring now to FIG. 2, an exemplary embodiment of the present invention is presented. A receiver station 200 located on a planetary surface may receive a signal from a celestial object, for example, a satellite 210. The satellite 210 may be in a field of view of the receiver station 200. Furthermore, the movement of the satellite 210 across the field of view of the receiver station 200 may generate a Doppler effect as described above. For example, the movement of the satellite 210 from a first position 210' to a second position 210", where such a transition causes the distance between the satellite 210 and the receiver station 200 to decrease, may generate a blueshift 212 in the satellite signal. Furthermore, the movement of the satellite 210 from the second position 210" to a third position 210''', where such a transition causes the distance between the satellite 210 and the receiver station 200 to increase, may generate a redshift 214 in the satellite signal. The frequency differential between the redshift 212 and blueshift 214 may enable the determination of orbital characteristics using the Doppler equation described above.

Moreover, as further shown in FIG. 2, the Doppler equation used for satellite 210 may be used for a plurality of satellites 220, 230, 240, to determine a precise location 202 of the receiver station as described above. While triangulation requires location determination using three satellites, it is contemplated and included within the scope of the invention that any number of satellites may be used in location determination. Use of additional satellites may increase the accuracy and/or precision with which location is determined.

Any RF waveform can be analyzed using the doppler effect to determine the closest approach to the desired point of interest (POI). Doppler calculations of the RF signal determine the apex of closet approach even if the orbital path is non coincident or offset from the POI. The differential gradient of the doppler calculations can be used to determine both the closest approach and offset. Frequencies and L band spectrum (i.e., a frequency range from 1 gigahertz (GHz) to 2 GHz, used in satellites are well defined, auctioned, and closely guarded, i.e., L1 band $f_s$=1.5754 GHz. The calculations are able to determine time of closest approach or local positional apex. In some embodiments, the closest approach point may be inferred based on the magnitude of the frequency shift and a wave width or half-width of the frequency shift. These calculations are low power and can be achieved with minimal processing. Measuring the frequency and applying doppler formulas derives the speed (V) of the satellite.

Once speed V is known, additional information can be derived about the satellite through known equations and constants using gravity (G), speed of light (c), and the orbital components of the satellite itself can be used to derive height and trajectory. Comparing this derived orbital data to an accurate internal clock with ephemeris data allows the POI to be triangulated using multiple overhead satellites within a generous sky view cone using an existing almanac of known satellite constellations and can be done offline and preloaded to the TSDSP device. This allows the system to work at the tactical edge of the battlespace with no reachback required. When connectivity is re-established, these units are able to upload/download back to a central repository to continuously improve the almanac.

Passively receiving the signal over a sufficient timeframe allows these mathematical calculations to occur. The RF waveform signals need only to be received to be analyzed and do not require decryption. It would be easier to determine position of both the satellite and subsequently the terrestrial POI if the carrier wave signal is known and therefore easier to decipher PNT data from the known orbit but this is not a requirement. These satellites would be considered cooperating assets. However, the satellite does not have to be a participating member of the system to provide a signal that can be calculated into positional data. Simply receiving the signals and therefore knowing the transmitted spectrum can divulge identifying information about the satellite. These received signals allow for a process of elimination to quickly determine a regional position fix. This passive system also allows for the use of transmitting non-cooperative (adversary) celestial assets for PNT data.

Existing satellite receiving antennas are highly technical and need to receive enormous amounts of fast data bursts. The TSDSP system requires a much lower gain and precise antennas as the system is broadly looking for a frequency shift rather than the digital data transmitted. This allows for a simpler and smaller antenna package able to listen to many signals simultaneously, thus increasing the system's precision.

It would be impossible to spoof or deny TSDSP signals as they are owned and operated by a variety of commercial and government entities and are too numerous to coordinate a Denial of Service (DoS) attack. Additionally, the broad spectrum of so many satellites would obviate a full-scale DoS, giving away location for a lethal counter strike. Furthermore, adversaries will find spoofing increasingly difficult to mask, since Doppler effect is well understood and there are many known physical characteristics and constants of orbital data. This technology is based primarily on physics which is "spoof-proof."

Figure 3:
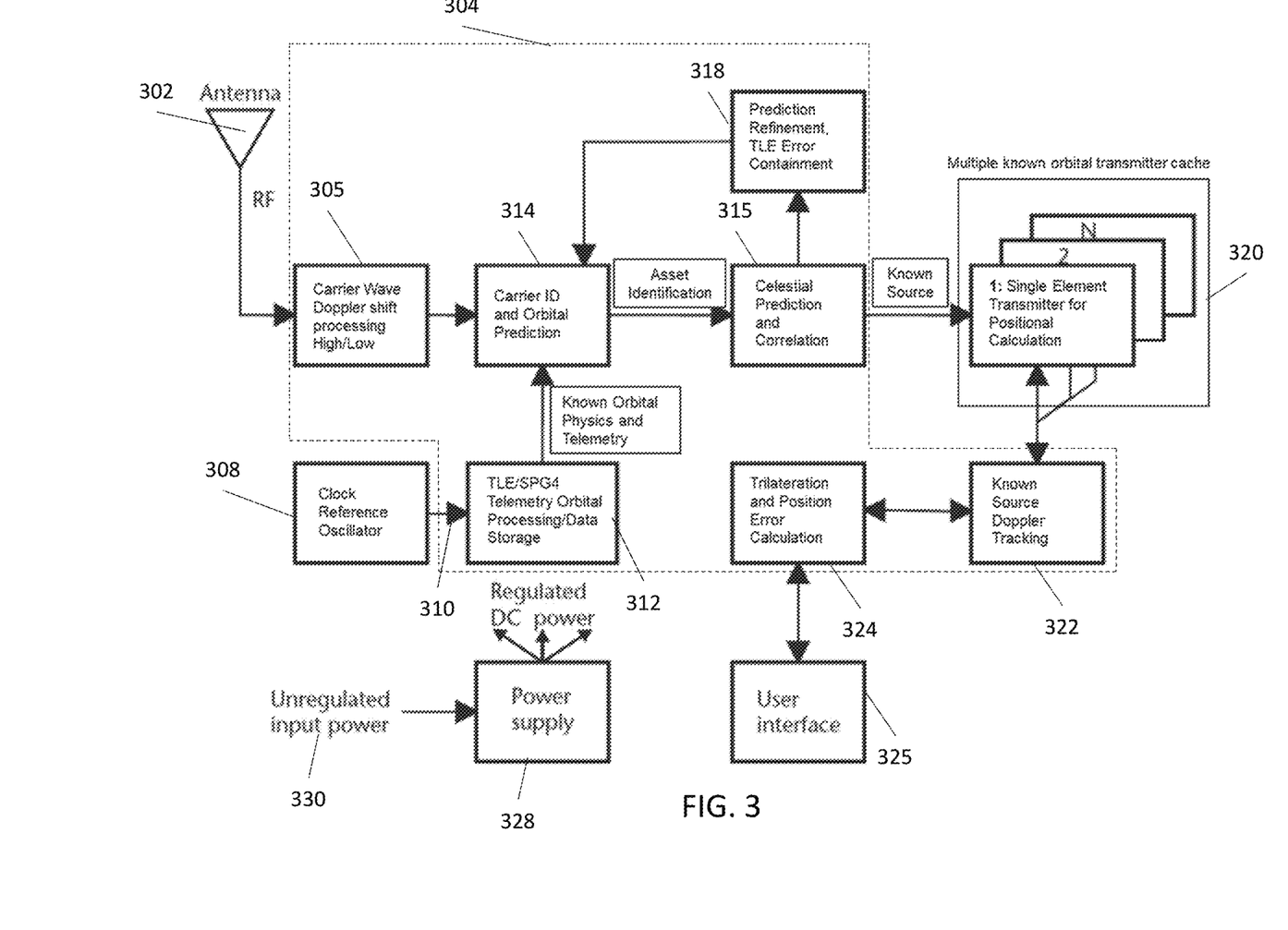
FIG. 3 is a schematic representation of a system according to an embodiment of the invention.

Referring now to FIG. 3, a system 300 according to an embodiment of the invention is presented. It is contemplated and included within the scope of the invention that the system 300 may be stationary on the planetary surface or may be in motion. When in motion, the measured Doppler effect will be affected by the speed and direction of the motion of the system 300. Correction in the Doppler calculation described above responsive to the velocity of the system is contemplated and included within the scope of the invention.

The system 300 may comprise an antenna 302. The antenna may be attuned to measure electromagnetic radiation within a target wavelength range. Such a range may include RF wavelengths. Moreover, the antenna 302 may be configured to simultaneously measure RF signals at multiple varying frequencies. This may allow for the concurrent monitoring of satellites for location determination, decreasing the length of time necessary to determine location. Additionally, the system 300 may comprise a multi-channel receiver (not shown) that may facilitate the simultaneous measuring of signals at different frequencies. As noted above, all measurements taken by the antenna 302 may be made passively, i.e. without emitting any RF waves responsive to any measured signal. Accordingly, there may be no external indication the antenna 302 has taken the measurement.

The system 300 may further comprise a processor 304. The processor 304 may be operably coupled to the antenna 302 and configured to receive measured signals therefrom. The processor 304 may be any type of processor as is known in the art for executing commands from software, including, but not limited to, microprocessors, integrated circuits (ICs), field programmable gate arrays (FPGAs), and the like. Many of the various functions performed by the processor 304 responsive to instructions received from software comprised by the system 300 as are described below are shown in FIG. 3. The system may further comprise non-transitory computer-readable media on which such software may be stored. Examples of such software include, but are not limited to, solid state drives (SSDs), hard disk drives (HDDs), FLASH memory, PROM, EPROM, EEPROM, optical memory, and any other storage medium as is known in the art. The processor 304 may perform a Doppler calculation 306 on measured signals received from the antenna 302. The Doppler calculation 306 may be performed on a carrier wave, as is commonly used in RF communication.

The system 300 may further comprise a clock 308. The clock 308 may be operable to provide an indication of the present time. Such clocks are well known in the art. Exemplary clocks include, but are not limited to, oscillators and atomic clocks. The clock 308 may provide an indication of the current time 310 to the processor 304. The processor 304 utilize the indication of the current time 310 in conjunction with the Doppler calculation 306 and a known satellite data set 312 to estimate the transmission and orbital characteristics of the satellite associated with the measured signal 314, which may subsequently be used to determine a subset of satellite candidates 316 that may correspond to the measured signal received from the antenna 302. The known satellite data set 312 may be a database of satellite orbital telemetry and transmission signal characteristics of satellites that have either been received from the operator of satellites or satellites previously observed by the system 300. It is contemplated and included within the scope of the invention that the known satellite data set 312 may be updated with observations by the system 300 and by information received from an external source. An example of data that may be comprised by the known satellite data set 312 is transmission frequency, orbital velocity, orbital height, and two-line element (TLE) data, as is known in the art to enable the calculation of satellite position and velocity for any point in the past or future. The data for the known satellite data set 312 may be sourced from any database that may comprise such information, including, but not limited to, CelesTrak™ and Skyfield. The accuracy of the prediction or regression of predictions made using TLE are limited to the propagation of errors from perturbation of the satellite. These errors require use of simplified general perturbation corrections, such as, but not limited to, SGP4.

Once the subset of satellite candidates are identified 316, subsequent measurements from the antenna 302 may provide additional data to refine the prediction of satellite candidates 318. Moreover, similar measurements and analysis of signals received from other satellites may be occurring simultaneously. Such simultaneous analysis may enable the elimination of satellite candidates that are geographically precluded from being simultaneously measured by the system 300. Once a single satellite candidate is identified for a measured signal, that identified satellite 319 may be added to a cache of known satellites 320 to be used for geographic positional calculation.

Once the cache of identified satellites 320 comprises at least three identified satellites, the processor 304 may continue with continuing to track those known satellites 322 and performing geolocation by trilateration 324 as is known in the art. The geolocation may be continuously updated responsive to subsequent measured signals from the same or new identified satellites, and the potential error in such geolocation may be calculated responsive to propagated uncertainties in relative location determination between the antenna 302 and each individual satellite. The resulting geolocation may be presented on a user interface 326 that may be comprised by the system 300.

The system 300 may further comprise a power supply 328 configured to condition power received from an unregulated power source 330 and make such conditioned power available to all componentry comprised by the system at appropriate voltages and currents.

Figure 4:
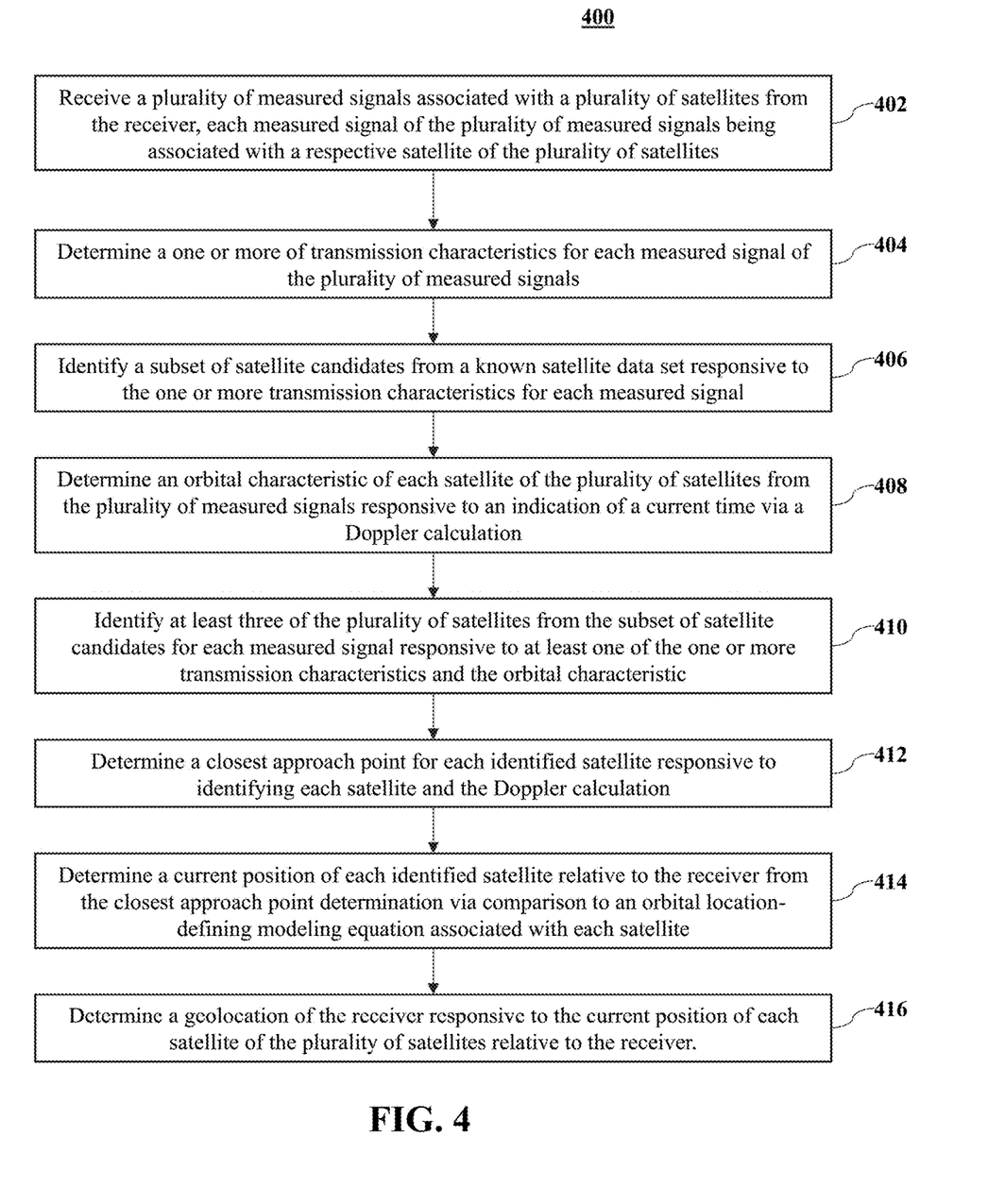
FIG. 4 is a method of geolocation according to an embodiment of the invention.

Referring now to FIG. 4, a method 400 according to an embodiment of the invention is presented. The method 400 may start with receiving a plurality of measured signals associated with a plurality of satellites from a multi-channel receiver 402. Such signals may be initially received by an antenna as described above and individually identified by the receiver. Each measured signal of the plurality of measured signals may be associated with a respective satellite of the plurality of satellites. More specifically, first, second, and third measured signals may be received by the antenna, processed by the multi-channel receiver, and provided to a processor. While pluralities will be discussed hence forth, it is contemplated and included within the scope of the invention that all such pluralities may be performed at least three times for three discrete satellites to enable triangulation of the location of the system performing this method 400.

The method 400 may continue with determining one or more transmission characteristics for each measured signal of the plurality of measured signals 404. Such transmission characteristics may include, but are not limited to, transmission frequency, a transmission power, a transmission compression characteristic, and waveform modulations. The method 400 may continue with identifying a subset of satellite candidates from a known satellite data set 406 responsive to the one or more transmission characteristics determined at 404. The method 400 may continue at 408 with determining an orbital characteristic of each satellite of the plurality of satellites from the plurality of measured signals responsive to an indication of a current time via a Doppler calculation, as described hereinabove. Such an orbital characteristic may be, but is not limited to, an orbital velocity of the satellite, an apex of closest approach, a closest approach point, an orbital heigh, and an orbital trajectory.

The method 400 may continue at 410 with identifying at least three satellites of the plurality of satellites from the subset of satellite candidates for each measured signal responsive to at least one of the one or more transmission characteristics and the orbital characteristic. The method 400 may continue at 412 with determining a closest approach point for each identified satellite responsive to identifying those satellites and the Doppler calculation. Specifically, the closest approach point may be determined by analyzing the Doppler shift gradient to derive a maximum frequency shift. By noting if the frequency is red shifting or blue shifting, one can know if the satellite is approaching or receding. At the point of closest approach, the frequency will be at the nominal point since the relative motion of the satellite is at its lowest relative to the receiver. That specific time position, when the blue shift becomes a red shift, is the point of closest approach. Additional information can be obtained by calculating the gradient of the change in frequency, such as proximity to the receiver and track offset, for known wave velocities, such as EMR signals.

The method 400 may continue at 414 with determining a current position of each identified satellite relative to the receiver from the determined closest approach point by comparing to an orbital location-defining modeling equation associated with each satellite. Such an orbital location-defining modeling equation may be, for example, a two-line element equation as described above. Determining the current position of the identified satellites relative to the receiver may comprise performing a satellite perturbation error reduction calculation as identified above. The method 400 may conclude at 416 with determining a geolocation of the receiver responsive to the current positioned of each identified satellite relative to the receiver, such as by triangulation.

Figure 5:
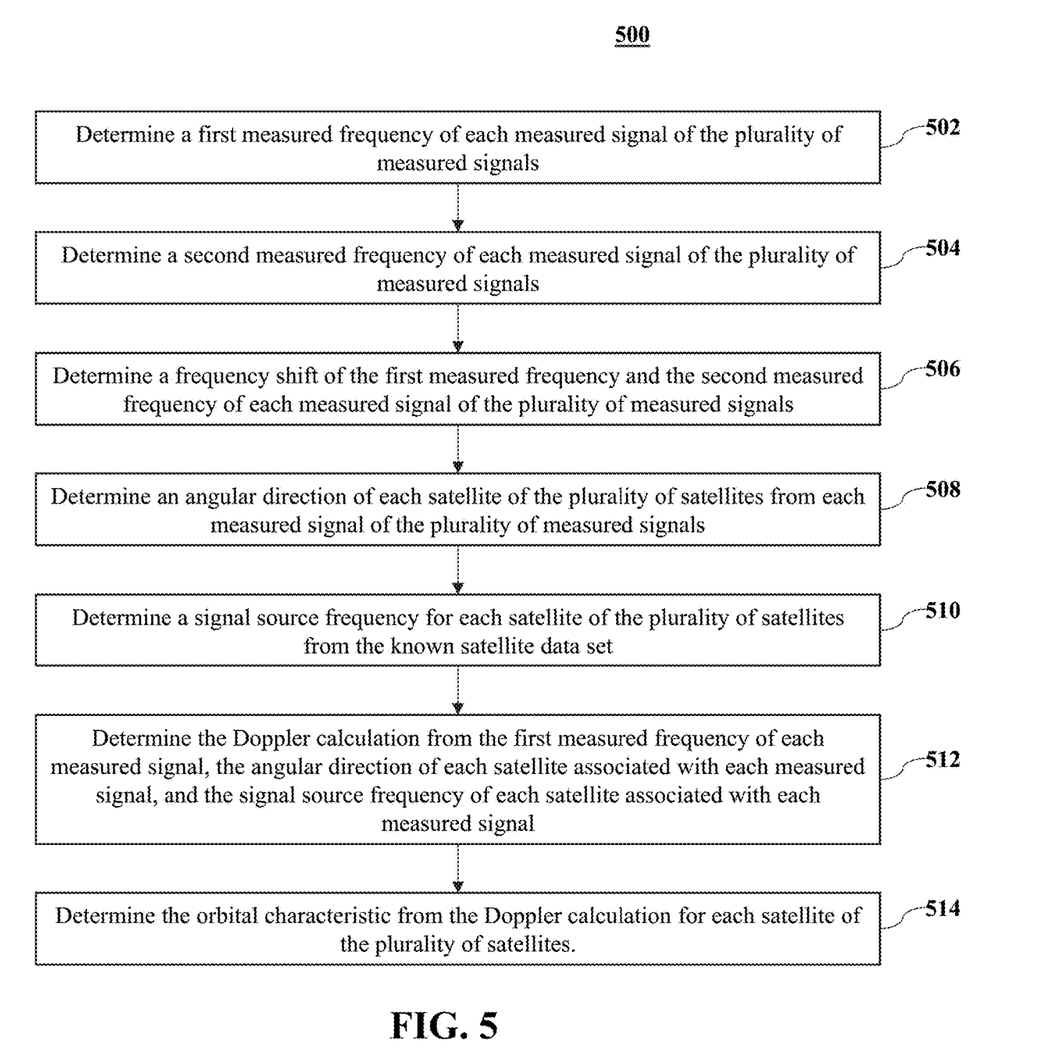
FIG. 5 is a method of determining an orbital characteristic of a satellite utilizing a Doppler calculation according to an embodiment of the invention.

Referring now to FIG. 5, a method 500 of determining an orbital characteristic via a Doppler calculation as taught at step 408 in FIG. 4 is presented. The method 500 may comprise determining a first measured frequency of each measured signal of the plurality of measured signals at 502 and determining a second measured frequency of each measured signal of the plurality of measured signals at 504. The first and second measured frequencies may be, respectively, redshift and blueshift, blueshift and redshift, redshift and redshift, or blueshift and blueshift. The method 500 may continue with determining a frequency shift of the first and second measured frequencies of each measured signal of the plurality of measured signals 506. The method 500 may continue with determining an angular direction of each satellite of the plurality of satellites from each measured signal of the plurality of measured signals at 508 and with determining a signal source frequency (i.e. the frequency of the measured signal without any Doppler effect) for each satellite of the plurality of satellites from the known satellite data set 510. The method 500 may continue at 512 with determining the Doppler calculation as described above from the first measured frequency of each measured signal, the angular direction of each satellite associated with each measured signal, and the signal source frequency of each satellite associated with each measured signal. Once determined, the method 500 may conclude at 514 with determining the orbital characteristic from the Doppler calculation for each satellite of the plurality of satellites.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for transient satellite doppler signal position determination comprising:
    an antenna positioned at a point of interest and configured to measure a received electromagnetic radiation (EMR) signal;
    a multi-channel receiver operably coupled to the antenna and configured to generate a measured signal by interpreting the received EMR signal from the antenna;
    an internal clock operable to provide an indication of a current time;
    a processor operably coupled to each of the receiver and the internal clock and configured to receive the measured signal from the receiver and the indication of the current time from the clock; and
    a non-transitory storage medium operably coupled to the processor and comprising software thereon configured to:
        receive a first measured signal associated with a first satellite from the receiver;
        determine one or more transmission characteristics from the first measured signal;
        identify a first subset of satellite candidates from a known satellite data set responsive to the one or more transmission characteristics;
        determine a first orbital characteristic of the first satellite from the first measured signal responsive to an indication of the current time via a first Doppler calculation;
        identify the first satellite from the first subset of satellite candidates responsive to at least one of the one or more transmission characteristics and the first orbital characteristic;

determine a first closest approach point responsive to identifying the first satellite and the first Doppler calculation;
determine a current position of the first satellite relative to the receiver from the first closest approach point determination via comparison to an orbital location-defining modeling equation associated with the first satellite;
receive a second measured signal associated with a second satellite from the receiver;
determine one or more transmission characteristics from the second measured signal;
identify a second subset of satellite candidates from a known satellite data set responsive to the one or more transmission characteristics of the second measured signal;
determine a second orbital characteristic of the second satellite from the second measured signal via a second Doppler calculation;
identify the second satellite from the second subset of satellite candidates responsive to at least one of the one or more transmission characteristics of the second measured signal and the second orbital characteristic;
determine a second closest approach point responsive to identifying the second satellite and the second Doppler calculation;
determine a current position of the second satellite relative to the receiver from the second closest approach point determination via comparison to the orbital location-defining modeling equation associated with the second satellite;
receive a third measured signal associated with a third satellite from the receiver;
determine one or more transmission characteristics from the third measured signal;
identify a third subset of satellite candidates from a known satellite data set responsive to the one or more transmission characteristics of the third measured signal;
determine a third orbital characteristic of the third satellite from the third measured signal via a third Doppler calculation;
identify the third satellite from the third subset of satellite candidates responsive to at least one of the one or more transmission characteristics of the third measured signal and the third orbital characteristic;
determine a third closest approach point responsive to identifying the third satellite and the third Doppler calculation;
determine a current position of the third satellite relative to the receiver from the third closest approach point determination via comparison to the orbital location-defining modeling equation associated with the third satellite; and
determine a geolocation of the receiver responsive to each of the current position of the first satellite relative to the receiver, the current position of the second satellite relative to the receiver, and the current position of the third satellite relative to the receiver.

2. The system of claim 1 wherein:
determining the first orbital characteristic via the first Doppler calculation comprises:
determining a first measured frequency of the first measured signal;
determining a second measured frequency of the first measured signal;
determining a frequency shift of the first measured frequency and the second measured frequency of the first measured signal;
determining an angular direction of the first satellite from the first measured signal;
determining a first signal source frequency from the known satellite data set;
determining the first Doppler calculation from the first measured frequency, the first angular direction, and the first signal source frequency; and
determining the first orbital characteristic from the first Doppler calculation;
determining the second orbital characteristic via the second Doppler calculation comprises:
determining a first measured frequency of the second measured signal;
determining a second measured frequency of the second measured signal;
determining a frequency shift of the second measured frequency and the second measured frequency of the second measured signal;
determining an angular direction of the second satellite from the second measured signal;
determining a second signal source frequency from the known satellite data set;
determining the second Doppler calculation from the second measured frequency, the second angular direction, and the second signal source frequency; and
determining the second orbital characteristic from the second Doppler calculation; and
determining the third orbital characteristic via the third Doppler calculation comprises:
determining a first measured frequency of the third measured signal;
determining a second measured frequency of the third measured signal;
determining a frequency shift of the third measured frequency and the second measured frequency of the third measured signal;
determining an angular direction of the third satellite from the third measured signal;
determining a third signal source frequency from the known satellite data set;
determining the third Doppler calculation from the third measured frequency, the third angular direction, and the third signal source frequency; and
determining the third orbital characteristic from the third Doppler calculation.

3. The system of claim 1, wherein the software is further configured to:
receive an update to the known satellite data set; and
update the known satellite data set with the update.

4. The system of claim 1 wherein:
determining the first orbital characteristic of the first satellite comprises at least one of:
determining a first apex of closest approach of the first satellite from the first measured signal;
determining a first orbital height of the first satellite from the first measured signal; and
determining a first trajectory of the first satellite from the first measured signal;
determining the second orbital characteristics of the second satellite comprises at least one of:

determining a second apex of closest approach of the second satellite from the second measured signal;
determining a second orbital height of the second satellite from the second measured signal; and
determining a second trajectory of the second satellite from the second measured signal; and
determining the third orbital characteristics of the third satellite comprises at least one of:
determining a third apex of closest approach of the third satellite from the third measured signal;
determining a third orbital height of the third satellite from the third measured signal; and
determining a third trajectory of the third satellite from the third measured signal.

5. The system of claim 1 wherein:
determining the current position of the first satellite relative to the receiver comprises performing a satellite perturbation error reduction calculation;
determining the current position of the second satellite relative to the receiver comprises performing a satellite perturbation error reduction calculation; and
determining the current position of the third satellite relative to the receiver comprises performing a satellite perturbation error reduction calculation.

6. The system of claim 1 wherein the internal clock is one of an oscillator and an atomic clock.

7. The system of claim 1 wherein each of the first measured signal, the second measured signal, and the third measured signal are measured passively.

8. The system of claim 1 wherein the antenna is configured to measure EMR within a radio frequency wavelength range.

9. The system of claim 1 wherein:
the first orbital characteristic identified from the first Doppler calculation is a first orbital velocity of the first satellite;
the second orbital characteristic identified from the second Doppler calculation is a second orbital velocity of the second satellite; and
the third orbital characteristic identified from the third Doppler calculation is a third orbital velocity of the third satellite.

10. The system of claim 1 wherein the orbital location-defining modeling equation is a two-line element modeling equation.

11. The system of claim 1 wherein the transmission characteristics comprise a transmission frequency, a transmission power, a transmission compression characteristic, and waveform modulations.

12. A method of location determination by transient satellite doppler signal measurement comprising the steps of:
receiving a first measured signal associated with a first satellite from the receiver;
determining one or more transmission characteristics from the first measured signal;
identifying a first subset of satellite candidates from a known satellite data set responsive to the one or more transmission characteristics;
determining a first orbital characteristic of the first satellite from the first measured signal responsive to an indication of a current time via a first Doppler calculation;
identifying the first satellite from the first subset of satellite candidates responsive to at least one of the one or more transmission characteristics and the first orbital characteristic;
determining a first closest approach point responsive to identifying the first satellite and the first Doppler calculation;
determining a current position of the first satellite relative to the receiver from the first closest approach point determination via comparison to an orbital location-defining modeling equation associated with the first satellite;
receiving a second measured signal associated with a second satellite from the receiver;
determining one or more transmission characteristics from the second measured signal;
identifying a second subset of satellite candidates from a known satellite data set responsive to the one or more transmission characteristics of the second measured signal;
determining a second orbital characteristic of the second satellite from the second measured signal via a second Doppler calculation;
identifying the second satellite from the second subset of satellite candidates responsive to at least one of the one or more transmission characteristics of the second measured signal and the second orbital characteristic;
determining a second closest approach point responsive to identifying the second satellite and the second Doppler calculation;
determining a current position of the second satellite relative to the receiver from the second closest approach point determination via comparison to the orbital location-defining modeling equation associated with the second satellite;
receiving a third measured signal associated with a third satellite from the receiver;
determining one or more transmission characteristics from the third measured signal;
identifying a third subset of satellite candidates from a known satellite data set responsive to the one or more transmission characteristics of the third measured signal;
determining a third orbital characteristic of the third satellite from the third measured signal via a third Doppler calculation;
identifying the third satellite from the third subset of satellite candidates responsive to at least one of the one or more transmission characteristics of the third measured signal and the third orbital characteristic;
determining a third closest approach point responsive to identifying the third satellite and the third Doppler calculation;
determining a current position of the third satellite relative to the receiver from the third closest approach point determination via comparison to the orbital location-defining modeling equation associated with the third satellite; and
determining a geolocation of the receiver responsive to each of the current position of the first satellite relative to the receiver, the current position of the second satellite relative to the receiver, and the current position of the third satellite relative to the receiver.

13. The method of claim 12 wherein:
determining the first orbital characteristic via the first Doppler calculation comprises:
determining a first measured frequency of the first measured signal;
determining a second measured frequency of the first measured signal;

determining a frequency shift of the first measured frequency and the second measured frequency of the first measured signal;
determining an angular direction of the first satellite from the first measured signal;
determining a first signal source frequency from the known satellite data set;
determining the first Doppler calculation from the first measured frequency, the first angular direction, and the first signal source frequency; and
determining the first orbital characteristic from the first Doppler calculation;
determining the second orbital characteristic via the second Doppler calculation comprises:
determining a first measured frequency of the second measured signal;
determining a second measured frequency of the second measured signal;
determining a frequency shift of the second measured frequency and the second measured frequency of the second measured signal;
determining an angular direction of the second satellite from the second measured signal;
determining a second signal source frequency from the known satellite data set;
determining the second Doppler calculation from the second measured frequency, the second angular direction, and the second signal source frequency; and
determining the second orbital characteristic from the second Doppler calculation; and
determining the third orbital characteristic via the third Doppler calculation comprises:
determining a first measured frequency of the third measured signal;
determining a second measured frequency of the third measured signal;
determining a frequency shift of the third measured frequency and the second measured frequency of the third measured signal;
determining an angular direction of the third satellite from the third measured signal;
determining a third signal source frequency from the known satellite data set; and
determining the third Doppler calculation from the third measured frequency, the third angular direction, and the third signal source frequency; and
determining the third orbital characteristic from the third Doppler calculation.

14. The method of claim 12 wherein:
determining the first orbital characteristic of the first satellite comprises at least one of:
determining a first apex of closest approach of the first satellite from the first measured signal;
determining a first orbital height of the first satellite from the first measured signal; and
determining a first trajectory of the first satellite from the first measured signal;
determining the second orbital characteristics of the second satellite comprises at least one of:
determining a second apex of closest approach of the second satellite from the second measured signal;
determining a second orbital height of the second satellite from the second measured signal; and
determining a second trajectory of the second satellite from the second measured signal; and determining the third orbital characteristics of the third satellite comprises at least one of:
determining a third apex of closest approach of the third satellite from the third measured signal;
determining a third orbital height of the third satellite from the third measured signal; and
determining a third trajectory of the third satellite from the third measured signal.

15. The method of claim 12 wherein each of the first measured signal, the second measured signal, and the third measured signal are measured passively.

16. The method of claim 12 wherein:
the first orbital characteristic identified from the first Doppler calculation is a first orbital velocity of the first satellite;
the second orbital characteristic identified from the second Doppler calculation is a second orbital velocity of the second satellite; and
the third orbital characteristic identified from the third Doppler calculation is a third orbital velocity of the third satellite.

17. The method of claim 12 wherein the orbital location-defining modeling equation is a two-line element modeling equation.

18. The method of claim 12 wherein the transmission characteristics comprise a transmission frequency, a transmission power, a transmission compression characteristic, and waveform modulations.

19. A method of location determination by transient satellite doppler signal measurement comprising the steps of:
receiving a plurality of measured signals associated with a plurality of satellites from the receiver, each measured signal of the plurality of measured signals being associated with a respective satellite of the plurality of satellites;
determining a one or more of transmission characteristics for each measured signal of the plurality of measured signals;
identifying a subset of satellite candidates from a known satellite data set responsive to the one or more transmission characteristics for each measured signal;
determining an orbital characteristic of each satellite of the plurality of satellites from the plurality measured signal responsive to an indication of a current time via a Doppler calculation;
identifying at least three satellites, defining identified satellites, of the plurality of satellites from the subset of satellite candidates for each measured signal responsive to at least one of the one or more transmission characteristics and the orbital characteristic;
determining a closest approach point for each satellite of the identified satellites responsive to identifying each satellite and the Doppler calculation;
determining a current position of each satellite of the identified satellites relative to the receiver from the closest approach point determination via comparison to an orbital location-defining modeling equation associated with each satellite; and
determining a geolocation of the receiver responsive to the current position of each satellite of the plurality of identified satellites relative to the receiver.

20. The method of claim 19 wherein determining the orbital characteristic via the Doppler calculation comprises:
determining a first measured frequency of each measured signal of the plurality of measured signals;

determining a second measured frequency of each measured signal of the plurality of measured signals;

determining a frequency shift of the first measured frequency and the second measured frequency of each measured signal of the plurality of measured signals;

determining an angular direction of each satellite of the plurality of satellites from each measured signal of the plurality of measured signals;

determining a signal source frequency for each satellite of the plurality of satellites from the known satellite data set;

determining the Doppler calculation from the first measured frequency of each measured signal, the angular direction of each satellite associated with each measured signal, and the signal source frequency of each satellite associated with each measured signal; and determining the orbital characteristic from the Doppler calculation for each satellite of the plurality of satellites.

\* \* \* \* \*

UNITED STATES PATENT AND TRADEMARK OFFICE
CERTIFICATE OF CORRECTION

| | |
|---|---|
| PATENT NO. | : 12,306,322 B2 |
| APPLICATION NO. | : 18/050442 |
| DATED | : May 20, 2025 |
| INVENTOR(S) | : Ricardo Romeu |

It is certified that error appears in the above-identified patent and that said Letters Patent is hereby corrected as shown below:

In the Claims

Claim 2, Column 16, Lines 10-11 and Claim 13, Column 19, Lines 8-9:
"... from the first measured frequency, the first angular direction" should be corrected to "... from the first measured frequency of the first measured signal, the first angular direction"

Claim 2, Column 16, Lines 28-29 and Claim 13, Column 19, Lines 26-27:
"... from the second measured frequency, the second angular" should be corrected to "... from the first measured frequency of the second measured signal, the second angular"

Claim 2, Column 16, Line 40-41 and Claim 13, Column 19, Lines 38-39:
"determining a frequency shift of the third measured frequency" should be corrected to "determined a frequency shift of the first measured frequency"

Claim 2, Column 16, Lines 47-48 and Claim 13, Column 19, Lines 45-46:
"determining the third Doppler calculation from the third measured frequency, the third angular" should be corrected to "determining the third Doppler calculation from the first measured frequency of the third measured signal, the third angular"

Signed and Sealed this
Fourteenth Day of October, 2025

John A. Squires
*Director of the United States Patent and Trademark Office*